March 17, 1925. 1,529,782
B. GERSTEIN
ICE CREAM FORM
Filed June 18, 1924
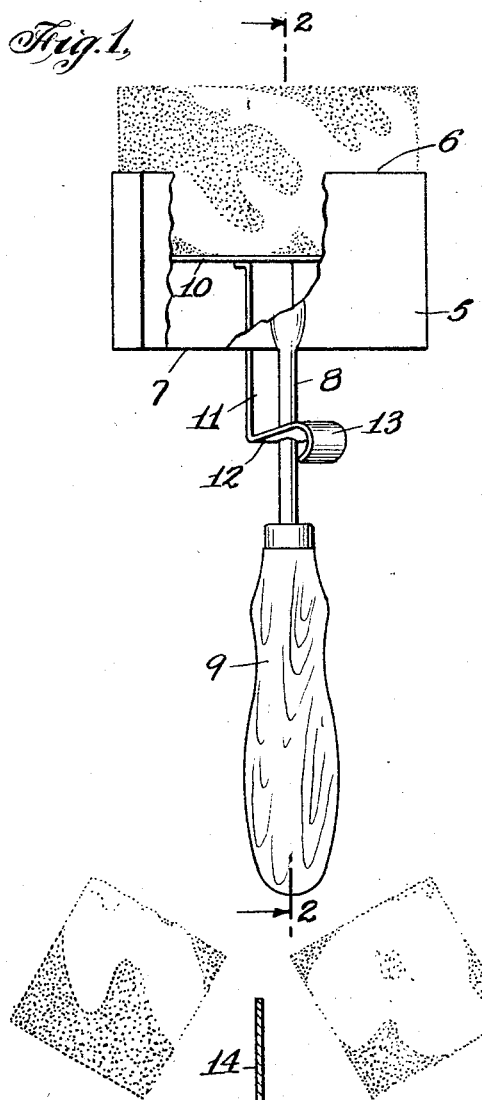
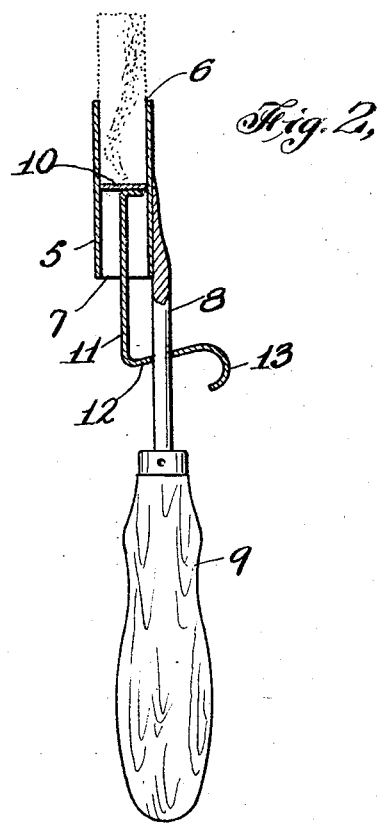
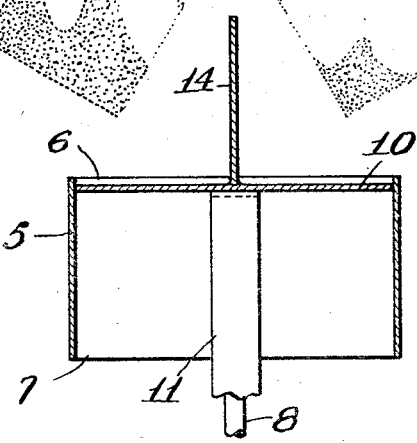
INVENTOR
Barnett Gerstein
BY
ATTORNEY Patented Mar. 17, 1925.

1,529,782

UNITED STATES PATENT OFFICE.

BARNETT GERSTEIN, OF COLLEGE POINT, NEW YORK.

ICE-CREAM FORM.

Application filed June 18, 1924. Serial No. 720,724.

*To all whom it may concern:*

Be it known that I, BARNETT GERSTEIN, a citizen of the United States, and residing at College Point, L. I., in the county of Queens and State of New York, have invented certain new and useful Improvements in Ice-Cream Forms, of which the following is a specification, such as will enable those skilled in the art to which it appertains to make and use the same.

This invention relates to ice cream forming or molding devices, and the object of the invention is to provide a device of this class by means of which one or more brick-shaped bodies of ice cream may be formed by simply inserting the device into a pan of ice cream, such as commonly employed in confectionery stores, or into which ice cream may be packed by the usual spoon; a still further object being to provide a device of the class specified, which by reason of its construction may be readily cleaned and kept clean; and with these and other objects in view, the invention consists in a forming device for ice cream, which is simple in construction and operation and efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a perspective view of my improved forming device, with part of the construction broken away.

Fig. 2 is a section on the line 2—2 of Fig. 1; and,

Fig. 3 is a section at right angles to that shown in Fig. 2 and showing a slight modification and with part of the construction omitted.

In the construction shown, I provide a form body or member 5, which is oblong and rectangular in form and composed of top, bottom and side walls, but open at the front and back as shown at 6 and 7 respectively. Secured to the top or bottom face of the member 5, by soldering, welding or in any other desired manner, is a rod 8 which forms a shank of a handle member provided with a hand piece 9 at its free end portion.

Movably mounted in the member 5 is an ejector plate or member 10, the dimensions of which are such as to fit snugly within the compartment of the member 5, and projecting from the back of the plate or member 10 is a finger piece 11 in the form of a strip of sheet metal, the free end portion of which is bent substantially at right angles as shown at 12 and curved as shown at 13 to form a thumb rest, to facilitate the manipulation of the device, and the rod 8 of the handle member passes through the part 12 of the finger piece 11.

In the use of the device shown in Figs. 1 and 2 of the drawing, the member 10 is drawn inwardly or backwardly to its innermost position, whereby said member rests within the chamber of the member 5, adjacent to the open end 7 thereof. The other open end 6 of the member 5 may be inserted into a body of ice cream in a tub or can, such as commonly employed, to compactly place ice cream within the chamber of the member 5, after which a spoon or other implement may be passed over the end portion 6 of the member 5 to form a smooth and finished end to the brick or cream within the chamber of the member 5, and this brick may be ejected onto a plate or the like by forcing the member 10 outwardly, by the thumb of the hand supporting the device, pressure being applied to the curved end 13 of the finger piece. It will also be understood that, if desired, ice cream of one or more kinds may be packed in the chamber of the member 5, by a spoon or similar implement, but it is believed that the first named method of procedure will be the quickest and simplest method of procedure, the latter procedure being preferably employed in placing more than one kind of ice cream in the mold or form.

In Fig. 3 of the drawing I have shown a slight modification in which a partition wall 14 is provided on the front or outer face of the plate or member 10 and this partition wall is movable with or carried by the member 10 and serves to form two independent bricks or blocks of ice cream, as diagrammatically illustrated in said figure. It will be understood that in making up my improved molds or forming devices in different sizes, any number of the partition plates may be employed. It will also be understood that I am not necessarily limited to the specific shape and form of the member 5 herein shown and described nor to the specific ejector means employed.

Aside from the utility of the device in forming neat and finished bricks or blocks of ice cream to be served in the home or in confectionery or other stores where ice cream is sold, I provide a device which may be readily cleaned and kept in proper condition for use at all times, this result being accomplished by providing the open ends 6 and 7 to the member 5, whereby any ice cream which may possibly gather or be retained in the chamber 5, after the ejector plate or member 10 is moved outwardly, may be readily removed, and while I have shown certain details of construction for carrying my invention into effect, I am not necessarily limited to these details, and various changes therein and modifications thereof may be made within the scope of the appended claims without departing from the spirit of my invention or sacrificing its advantages.

Having fully described my invention, what I claim as new and desire to secure by Letters-Patent, is:—

1. An ice cream forming device of the class described comprising a form body having parallel walls, said form body being provided at opposite ends with openings of similar contour, ejector means mounted in said body and movable from one open end thereof to the other whereby ice cream may be placed in said body and ejected therefrom, a handle member secured to one of said parallel walls and extending substantially parallel to the axis of said body, and means movable longitudinally of the shank of said handle member and coupled with said ejector means for moving the latter in said body into different positions.

2. An ice cream forming device of the class described comprising a form body having parallel walls, said form body being provided at opposite ends with openings of similar contour, ejector means mounted in said body and movable from one open end thereof to the other whereby ice cream may be placed in said body and ejected therefrom, a handle member on said body and projecting therefrom, and means movable longitudinally of the shank of said handle member and coupled with said ejector means for moving the latter in said body into different positions, said last named means cooperating with said body, and an enlargement on said handle member for serving to limit the movement of said ejector means in both directions of movement in said body.

3. An ice cream form device of the class described comprising a member having a mold chamber therein, an ejector normally positioned at one end portion of said chamber and movable toward the other end portion thereof, and means on said ejector and projecting into said chamber for dividing said chamber into separate compartments whereby separate and independent bodies of ice cream may be formed by said member and ejected therefrom.

4. An ice cream form device of the class described comprising a member having a mold chamber therein, an ejector normally positioned at one end portion of said chamber and movable toward the other end portion thereof, means on said ejector and projecting into said chamber for dividing said chamber into separate compartments whereby separate and independent bodies of ice cream may be formed by said member and ejected therefrom, and said member being open at its opposite ends.

In testimony that I claim the foregoing as my invention I have signed my name this 17th day of June 1924.

BARNETT GERSTEIN.